United States Patent [19]
Rowe

[11] 3,765,862
[45] Oct. 16, 1973

[54] APPARATUS FOR MAKING GLASSWARE BY A PRESS AND BLOW TECHNIQUE

[75] Inventor: George E. Rowe, Wethersfield, Conn.

[73] Assignee: Emhart Corporation, Bloomfield, Conn.

[22] Filed: Apr. 2, 1971

[21] Appl. No.: 130,732

[52] U.S. Cl. ............ 65/229, 65/264, 65/307, 65/361, 65/357
[51] Int. Cl. .............. C03b 9/00, C03b 11/00
[58] Field of Search ............ 65/229, 231, 230, 65/78, 79, 307, 361, 183, 264, 357

[56] References Cited
UNITED STATES PATENTS

| | | | |
|---|---|---|---|
| 687,595 | 11/1901 | Blue | 65/229 |
| 1,547,933 | 7/1925 | Martin | 65/229 X |
| 1,601,836 | 10/1926 | Stenhouse | 65/231 |
| 2,849,838 | 9/1958 | Bartlett | 65/229 X |
| 3,434,820 | 3/1969 | Zappia et al. | 65/229 X |
| 3,184,297 | 5/1965 | Van Zonneveld | 65/78 X |
| 947,632 | 1/1910 | Bolton | 65/307 |
| 666,141 | 1/1901 | Jackson | 65/229 |

Primary Examiner—Frank W. Miga
Attorney—Roger B. McCormick

[57] ABSTRACT

An apparatus and method for making glassware by a press and blow technique wherein the pressed parison is formed in an upright mold construction. The said mold construction utilizes a relatively wide cavity body mold and a relatively narrow opening neck mold, and also an intermediate "transitional" mold which is placed between the neck mold and body mold when the parison is initially formed. The transitional or intermediate mold is opened after the parison has been formed to permit the parison to reheat and stretch before being placed in a blow mold or other final shaping mold where the parison is blown or otherwise expanded to the final size and shape desired for the article of glassware.

4 Claims, 7 Drawing Figures

APPARATUS FOR MAKING GLASSWARE BY A PRESS AND BLOW TECHNIQUE

BACKGROUND OF THE INVENTION

The invention is in the field of glassware forming, and relates more particularly to the forming of glassware in a press and blow technique utilizing apparatus including an upright parison mold. The press and blow technique for forming glassware has long been recognized as the most desirable method of producing glass containers. However, the use of the press and blow technique involving an upright parison mold is generally limited to the manufacture of wide mouth containers. That is, there are two conditions which must be satisfied to make serviceable containers in upright parison or blank molds. First, there must be the capability of placing sufficient molten glass in the blank mold, and second, there must be the capability of displacing enough of the molten glass from the blank mold by a plunger thrust through an associated neck mold or ring to fill the space between the plunger and the neck ring and top portion of the blank mold. Heretofore, these conditions have only been satisfied in the manufacture of relatively wide mouth glassware containers.

SUMMARY OF THE INVENTION

In accordance with the present invention, the use of the upright press and blow technique is extended in range to the manufacture of relatively narrow neck containers and bottles and also to a greater variety of shapes in relatively wide mouth glassware. The parison mold construction utilized includes an upright body mold defining an open top cavity which determines the body shape of the parison. A neck mold is utilized and defines an opening for determining the diameter and "finish" of the parison at its mouth. In addition, an intermediate mold is used and it defines an opening, the top portion of which matches the relatively narrow opening in the neck mold and the bottom end of which matches the relatively wide opening at the top of the body mold cavity. These three molds in the parison mold construction are movable relative to each other so that the body mold can receive a gob of molten glass and then engage the bottom of the intermediate mold. A plunger is thrust through the neck mold and intermediate mold into the gob of glass in the body mold cavity to form the parison by forcing the molten glass against the cavity walls and by displacing enough of the molten glass upwardly to fill all of the space between the plunger and the surrounding neck and intermediate molds. Then, the plunger and body mold are stripped from the formed parison, and the intermediate mold, which comprises a plurality of sections, is opened. The parison, which now hangs from the neck mold, will reheat and it can be permitted to hang long enough to stretch downwardly to define a relatively long neck before a final shaping mold is closed on the parison. Generally the final shaping mold is a blow mold wherein the parison is blown to expand to final shape, but the parison can be otherwise expanded to final shape in a mold.

DESCRIPTION OF THE PREFERRED EMBODIMENT

Figure 1:
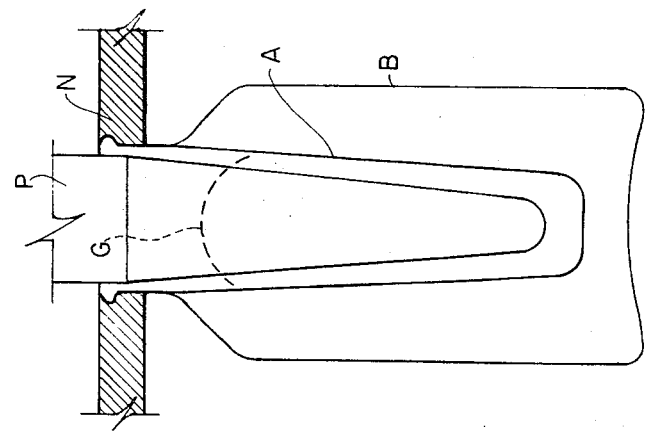
FIG. 1 is a schematic illustration of a known manner in which a wide mouth glass container is formed by the press and blow technique.

In FIG. 1, wherein the press and blow making of wide mouth ware is schematically illustrated, the neck mold is designated by the letter N, the cavity in the parison body mold is indicated at A, the cavity in the blow mold (which defines the final bottle shape) is indicated at B, the glass gob introduced to the parison body mold cavity is indicated at G, and the pressing plunger is shown at P. There is no difficulty encountered in making the wide mouth glassware article shown in FIG. 1 by the upright press and blow technique because of the wide opening defined in the neck mold N and which determines the final shape and size of the "finish" of the glassware article at its mouth. As can be seen, the parison body cavity A which must match the bottom of the opening in the neck ring N is quite wide and thus it can receive a relatively heavy gob of glass G before the neck ring or mold N is closed to define the top opening in the position shown. Accordingly, when the plunger P is thrust into the blank or parison mold cavity A, the molten glass in the gob G is pressed into good glass-metal contact with the parison cavity and a portion of the molten glass is displaced upwardly to fill the opening in the neck ring N around the plunger and thus to define the finish of the parison.

When the plunger P is moved upwardly out of the parison and the parison body mold is moved downwardly, the suspended parison can be held or transferred by the neck ring into position wherein the blow mold is closed upon it to define the blow cavity B. Then, air or other gas under pressure is introduced through the neck ring opening to blow the parison into the final shape defined by the cavity B. There will be sufficient glass in the parison so that the final wide mouth container has a relatively heavy wall thickness to withstand bursting pressure if the finally shaped container is filled with a carbonated beverage or the like. (While the final shaping can be performed by other than blowing, as for example by using vacuum, reference hereinafter will be limited to blowing the parison to final shape in a blow mold.)

Figure 2:
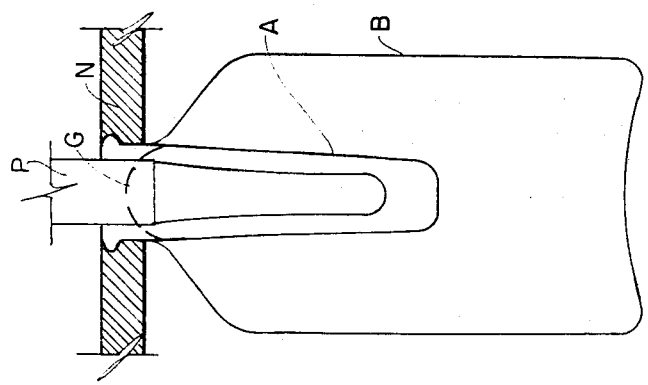
FIG. 2 is a similar illustration showing an attempt to form a narrow neck container by a known press and blow technique, but wherein a fully serviceable container may not be formed.

In FIG. 2 there is shown the manner in which a container of similar size but having a relatively narrow neck might be formed with the aforedescribed press and blow technique. Here again, the top opening of the blank or parison mold cavity A must match the opening in the neck ring N. Since the opening in the neck ring or mold N is relatively narrow, the top opening of the blank mold cavity must be reduced to a matching size, and it can take only a gob of glass G of much lesser weight than the case in the manufacture of a wide mouth container. A plunger P of lesser diameter must be used to displace the molten glass G, hopefully to fill the neck ring opening, and the remaining molten glass when blown to the final shape B can only provide for a relatively thin walled narrow neck bottle.

Therefore, when upright parison molds are utilized in the press and blow manufacture of narrow neck glassware having a relatively large body such as shown in FIG. 2, only a thin walled container can be provided, and the thin wall may not withstand the internal bursting pressure if the container is filled with a carbonated beverage. This limitation on glass weight in the press and blow manufacture of narrow neck containers of the type described is a great disadvantage and is so serious as to dictate against the use of the press and blow technique for such types of narrow neck glassware.

Figure 3:
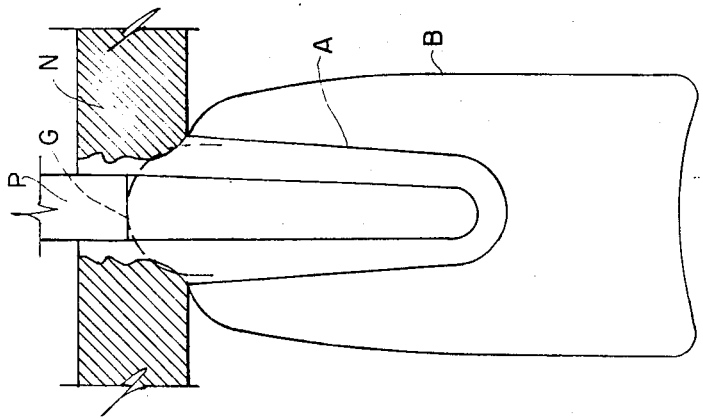
FIG. 3 is a view similar to FIGS. 1 and 2 and illustrating the manner in which a narrow neck container can be formed presently and in accordance with known apparatus using the press and blow technique.

As previously mentioned, the limitation on glass weight is dictated by the necessity for the top opening of the body mold cavity to match the bottom of the opening in the neck mold. One way that has heretofore been tried to increase glass weight in the manufacture of narrow neck ware by the press and blow technique is shown in FIG. 3. That is, in FIG. 3 there is shown a neck mold N having a relatively narrow opening at the top but which flares outwardly at the bottom so that the body mold cavity A can be relatively wide and still match the bottom of the neck mold opening. Thus, a heavier gob of glass G can be deposited in the body mold cavity A and be displaced by the plunger P to fill the said cavity and the neck ring opening.

However, since the blow mold employed in making the article of glassware must also match the bottom of the opening in the neck ring N, this means that the neck ring contour must be a part of the final shape of the container. Accordingly, such relatively narrow neck containers are limited to forms having a short neck and high shoulder as illustrated in FIG. 3. Therefore, according to known apparatus for making press and blow glassware, narrow neck ware made on such apparatus must either be dangerously limited in the weight of the glass used (resulting in thin walled containers) or they must be limited in shape to a short neck high shouldered container to provide sufficient glass weight for a container of safe wall thicknesses.

According to the present invention wherein the mold construction shown in FIGS. 4–7 is employed, narrow neck glassware can be made by a press and blow technique with sufficient glass weight to assure a safe wall thickness and can also be made with either a relatively short neck or a relatively long neck as desired. The said mold construction includes a parison or blank body mold 10, a neck mold 12, and an intermediate "transitional" mold 14. The body mold 10 is preferably of one-piece construction, but it can be made in separable sections, to define the body cavity 16 which determines the body shape of the formed parison. As shown, the body cavity 16 is open at the top and is relatively wide so that a rather heavy gob of glass G can be deposited in it.

The neck ring or mold 12 preferably comprises two separable sections to define an opening 20. The opening 20 determines the shape of the finish, and in the example shown, this finish includes an external securing bead or thread 22.

Figure 4:
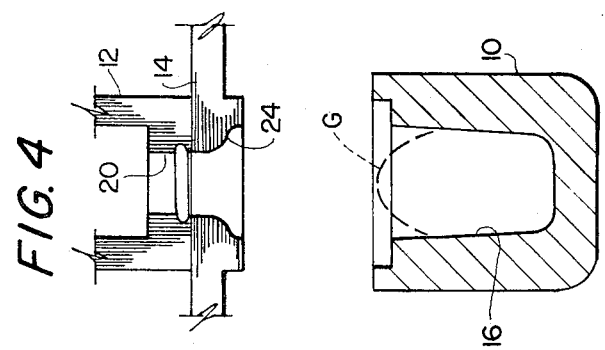
FIG. 4 is a schematic illustration of a mold construction provided in accordance with the present invention for forming narrow neck press and blow glassware and shows the parison body mold separated from the neck mold and intermediate mold.

The intermediate mold 14 is also preferably a two-piece construction wherein the sections are separable but when engaged define an opening 24 through the said mold. As seen in FIG. 4, the top portion of the opening 24 in the intermediate mold is aligned with and matches the bottom of the opening 20 in the neck mold, and the bottom end of the opening 24 is aligned with and matches the top opening of the cavity 16 in the body mold 10.

While other relative movement between the mold elements 10, 12 and 14 can be employed within the scope of this invention, it is preferred for most constructions that the body mold 10 be movable relative to the neck and intermediate molds 12 and 14 so that the gob of glass G can be deposited in the cavity 16 with the body mold 10 remote from the said neck and intermediate molds. Then, the body mold is brought into engagement with the bottom of the intermediate mold to the position shown in FIG. 5. An annular mold holder (not shown) located at the end of a movable arm can embrace the body mold 10 to carry it for the aforedescribed movement and thereafter to move the body mold 10 vertically downwardly from the position shown in FIG. 5 to strip it away from a formed parison.

Each section 14 of the intermediate mold is also carried at the end of an arm (not shown) so that the sections can be moved into engagement with the bottom of the neck mold 12 to define the opening 24 and to be moved away from such engagement. Preferably, the said arms will be pivotally supported so that the sections of the intermediate mold are moved into and out of engagement with each other in a generally horizontal direction.

The sections 12 of the neck mold can similarly be supported at the ends of arms to be brought into engagement with each other to define the opening 20. These arms (not shown) may also be pivotally mounted for the closing and opening movement of the neck mold 12, and they can also be mounted to move the neck mold from one position to another, that is, from a parison forming or pressing station to a final forming or blowing station.

In the operation of the parison forming mold construction, the neck mold 12 and the intermediate mold 14 are closed in engagement with each other to define the communicating neck mold and intermediate mold openings 20 and 24. The body mold 10 with the gob of molten glass G deposited therein is then moved into engagement with the bottom of the intermediate mold 14 as shown in FIG. 5, and a plunger P is thrust through the neck ring opening and intermediate mold opening into the cavity 16 in the body mold 10 to press the molten glass against the sides of the said cavity and to displace some of the molten glass upwardly into the neck ring and intermediate mold openings to provide the initial shape of the parison indicated at 26 in FIG. 5.

Figure 5:
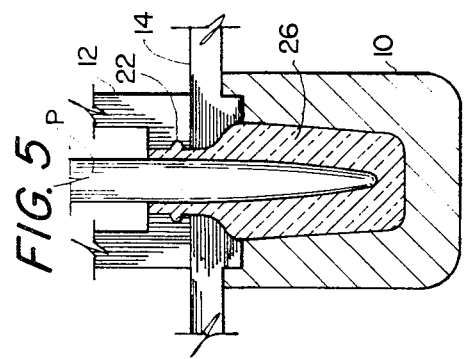
FIG. 5 is a view similar to FIG. 4 but showing the body mold engaged with the intermediate mold and also showing the pressing plunger thrust through the neck mold and into the body mold.

After pressing the parison as illustrated in FIG. 5, the body mold 10 is moved vertically downwardly relative to the other molds, and the pressing plunger P is moved vertically upwardly to be withdrawn or stripped from the formed parison. This leaves the parison suspended in the neck mold opening and extending through the intermediate mold opening. With the removal of the body mold 10 from the exterior surface of the parison and the plunger P from the interior surface of the parison, the molten glass in the parison will stretch downwardly and change its shape to that indicated generally by the reference number 28 in FIG. 6, this being caused by the residual heat in the molten glass distributed through the wall of the parison. The time that the parison is suspended by the neck mold is referred to as the "reheat" phase.

During this period of reheat, at any selected time, the sections 14 of the intermediate mold are moved out of engagement with each other and with the neck mold 12. The presence of the intermediate mold sections influence the distribution of heat in the molten glass of the parison and thus influence the stretching of the parison during the reheat phase. Therefore, the time for removal of the intermediate mold sections 14 is influenced by the desired final shape. The longer the reheat time, the greater the stretch in the parison and the greater the tendency is to form a long neck parison. The stretching of the parison can be accelerated by introducing air or other gas thereto through the neck ring opening, if desired. The air or gas introduced for parison forming is referred to as "puff air" and it is not introduced at high pressure, such as would effect terminal blowing of the container.

Figure 7:
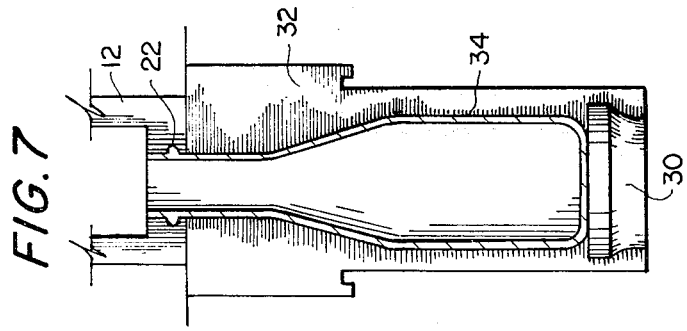
FIG. 7 shows the formed parison enclosed within the blow mold and blown into the final shape of a relatively long and narrow neck bottle.
Figure 6:
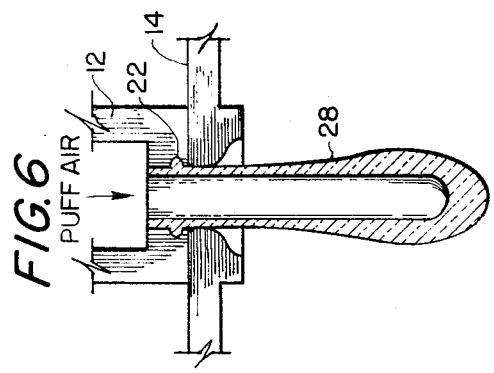
FIG. 6 shows the formed parison after removal of the body mold and after some reheating and stretching of the parison has taken place.

After removal of the intermediate mold, the parison is supported and moved by the neck mold 12 to the final shaping or blowing station shown in FIG. 7. At the blowing station, a bottom plate 30 is moved vertically upwardly to the position shown to define the bottom wall of the final blowing cavity which is further defined by a pair of blow mold sections 32 which are brought into engagement with each other, with the bottom plate 30 and with the bottom of the neck ring or mold 12. As can be seen in FIG. 7, the blow mold cavity has a top opening which precisely matches and is alinged with the bottom of the opening 20 in the neck ring 12. Then, when a blow head (not shown) is lowered into engagement with the neck ring at the top of its opening and air or other gas is introduced under pressure therein, the parison is blown to the final shape of the glass container as indicated at 34.

This final shape for the article of glassware may provide for a long neck bottle as shown or it can provide for a relatively short neck, high shoulder bottle, if desired. In either event, and in accordance with the present invention, the formed container will have sufficient glass weight to provide for a wall thickness that is safe when the container is filled with a carbonated beverage.

I claim:

1. A parison mold construction for the manufacture of glassware by a press and blow technique comprising an upright body mold defining an open top cavity for determining the body shape of the parison, an annular neck mold adapted to be located above the body mold with its opening on an axis common to the body mold cavity and with its opening shaped to determine the diameter and finish of the parison at its mouth and for supporting the parison, and an intermediate mold comprising a plurality of sections which are movable into engagement with each other and also into engagement with the bottom of the neck mold, the engaged intermediate mold sections defining an opening which is shaped at its top to match the bottom of the opening in the neck mold and which is shaped at its bottom to match the top opening of the body mold, and the said opening defined by the engaged intermediate mold sections being on the said common axis, the body mold being open at the top to receive a gob of molten glass and being movable relative to the other molds into engagement with the bottom of the intermediate mold with its top opening in registry with the bottom of the intermediate mold opening, whereby when a pressing plunger is thrust through the neck and intermediate molds into the body mold cavity, molten glass can be displaced from the body mold to fill the neck and intermediate mold oepnings around the plunger to form the top portion of the article of glassware between the plunger and neck mold, the body mold also being vertically movable relative to the other molds to leave a formed parison supported in the neck mold.

2. The mold construction defined in claim 1 wherein the top opening of the body mold cavity is substantially larger than the opening in the neck mold.

3. The mold construction as set forth in claim 2 wherein the neck mold comprises a plurality of sections which are movable relative to each other into engagement to define its opening, and the intermediate mold sections are movable generally horizontally into and out of engagement with each other.

4. The mold construction of claim 3 wherein the body mold is of one-piece construction and is movable generally vertically relative to the other molds into engagement with the bottom of the intermediate mold.

* * * * *